(12) United States Patent
Eguro et al.

(10) Patent No.: US 9,760,770 B2
(45) Date of Patent: Sep. 12, 2017

(54) PARALLEL MEMORIES FOR MULTIDIMENSIONAL DATA ACCESS

(71) Applicant: Microsoft Corporation, Redmond, WA (US)

(72) Inventors: Kenneth Hiroshi Eguro, Seattle, WA (US); Ray A. Bittner, Jr., Bothell, WA (US); George E. Smith, Bellevue, WA (US); Shawn Michael Swilley, Kent, WA (US); Rehan Ahmed, Kelowna (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 13/918,892

(22) Filed: Jun. 14, 2013

(65) Prior Publication Data
US 2014/0310496 A1 Oct. 16, 2014

Related U.S. Application Data

(60) Provisional application No. 61/812,232, filed on Apr. 15, 2013.

(51) Int. Cl.
*G06K 9/00* (2006.01)
*H04N 5/33* (2006.01)
(Continued)

(52) U.S. Cl.
CPC ...... *G06K 9/00536* (2013.01); *B29C 67/0051* (2013.01); *G01B 11/22* (2013.01); *G01B 11/25* (2013.01); *G01B 11/2513* (2013.01); *G01B 11/2527* (2013.01); *G01B 11/2545* (2013.01); *G02B 5/1895* (2013.01); *G02B 27/4205* (2013.01); *G02B 27/44* (2013.01); *G06F 3/0653* (2013.01); *G06F 3/0659* (2013.01); *G06F 3/0683* (2013.01); *G06F 9/3004* (2013.01); *G06F 9/30043* (2013.01);
(Continued)

(58) Field of Classification Search
None
See application file for complete search history.

(56) References Cited

U.S. PATENT DOCUMENTS 3,938,102 A 2/1976 Morrin et al.

FOREIGN PATENT DOCUMENTS

| EP | 0085210 A1 | 8/1983 |
|---|---|---|
| WO | 2006016303 A2 | 2/2006 |
| WO | 2007132399 A1 | 11/2007 |

OTHER PUBLICATIONS

Kuon, et al., "FPGA Architecture: Survey and Challenges", In Proceeding of Foundations and Trends in Electronic Design Automation, vol. 2, Issue 2, Feb. 2008, pp. 135-253.
(Continued)

*Primary Examiner* — Midys Rojas

(57) ABSTRACT

The subject disclosure is directed towards loading parallel memories (e.g., in one or more FPGAs) with multidimensional data in an interleaved manner such that a multidimensional patch/window may be filled with corresponding data in a single parallel read of the memories. Depending on the position of the patch, the data may be rotated horizontally and/or vertically, for example, so that the data in each patch is consistently arranged in the patch regardless of from which memory each piece of data was read. Also described is leveraging dual ported memory for multiple line reads and/or loading one part of a buffer while reading from another.

20 Claims, 11 Drawing Sheets

(51) Int. Cl.
| | |
|---|---|
| G06K 9/62 | (2006.01) |
| G06F 11/30 | (2006.01) |
| G06F 3/06 | (2006.01) |
| G06F 9/30 | (2006.01) |
| G06F 12/02 | (2006.01) |
| G06F 12/00 | (2006.01) |
| H04N 13/02 | (2006.01) |
| H04N 13/00 | (2006.01) |
| G02B 27/42 | (2006.01) |
| B29C 67/00 | (2017.01) |
| G02B 5/18 | (2006.01) |
| G02B 27/44 | (2006.01) |
| H04N 5/225 | (2006.01) |
| H04N 9/04 | (2006.01) |
| H04N 17/00 | (2006.01) |
| G01B 11/25 | (2006.01) |
| G01B 11/22 | (2006.01) |
| G06T 1/60 | (2006.01) |
| G06T 7/00 | (2017.01) |
| G06T 7/586 | (2017.01) |
| A63F 13/213 | (2014.01) |

(52) U.S. Cl.
CPC ...... *G06F 9/30127* (2013.01); *G06F 11/3024* (2013.01); *G06F 12/00* (2013.01); *G06F 12/02* (2013.01); *G06F 12/0207* (2013.01); *G06F 12/0292* (2013.01); *G06K 9/0063* (2013.01); *G06K 9/00201* (2013.01); *G06K 9/62* (2013.01); *G06T 1/60* (2013.01); *G06T 7/00* (2013.01); *G06T 7/586* (2017.01); *H04N 5/2256* (2013.01); *H04N 5/33* (2013.01); *H04N 5/332* (2013.01); *H04N 9/045* (2013.01); *H04N 13/0022* (2013.01); *H04N 13/02* (2013.01); *H04N 13/025* (2013.01); *H04N 13/0239* (2013.01); *H04N 13/0253* (2013.01); *H04N 13/0271* (2013.01); *H04N 17/002* (2013.01); *A63F 13/213* (2014.09); *G06T 2207/30244* (2013.01); *H04N 2013/0081* (2013.01)

(56) References Cited

OTHER PUBLICATIONS

Yamaguchi, et al., "Interleaved Pixel Lookup for Embedded Computer Vision", In Proceedings of IEEE of Computer Society Conference on Computer Vision and Pattern Recognition Workshops, Jun. 2008, pp. 1-8.

"Written Opinion for PCT Patent Application No. PCT/US2014/033915", Mailed Date: Jan. 8, 2015, 9 Pages.

"Second Written Opinion Issued in PCT Patent Application No. PCT/US2014/033915", Mailed Date: Apr. 7, 2015, 10 Pages.

Chihoub, et al., "A Band Processing Imaging Library for a TriCore-Based Digital Still Camera", In Research Article of Real-Time Imaging, An Academic Press Publication, vol. 7, Issue 4, Aug. 1, 2001, pp. 327-337.

"Office Action Issued in European Patent Application No. 14723271.4", Mailed Date: Sep. 19, 2016, 9 Pages.

"Office Action Issued in European Patent Application No. 14723271.4", dated Jun. 29, 2017, 12 pages.

"The IBM System/360 Model 91: Machine Philosophy and Instruction—Handling", Published in IBM Journal of Research and Development, vol. 11, Issue 1, Jan. 1, 1967, pp. 8-24.

| A 0, 0 MemW | B 1, 0 MemX | C 2, 0 MemW | D 3, 0 MemX |
|---|---|---|---|
| E 0, 1 MemY | F 1,1 MemZ | G 2, 1 MemY | H 3, 1 MemZ |
| I 0, 2 MemW | J 1, 2 MemX | K 2, 2 MemW | L 3, 2 MemX |
| M 0, 3 MemY | N 1, 3 MemZ | O 2, 3 MemY | P 3, 3 MemZ |

*FIG. 2A*

MemW
| A 0, 0 | C 2, 0 |
|---|---|
| I 0, 2 | K 2, 2 |

MemX
| B 1, 0 | D 3, 0 |
|---|---|
| J 1, 2 | L 3, 2 |

MemY
| E 0, 1 | G 2, 1 |
|---|---|
| M 0, 3 | O 2, 3 |

MemZ
| F 1,1 | H 3, 1 |
|---|---|
| N 1, 3 | P 3, 3 |

*FIG. 2B*

PARALLEL MEMORIES FOR MULTIDIMENSIONAL DATA ACCESS

CROSS-REFERENCE TO RELATED APPLICATION

The present application claims priority to U.S. provisional patent application Ser. No. 61/812,232, filed Apr. 15, 2013.

BACKGROUND

Standard image and signal processing algorithms generally process data within a sample window (e.g. a Gaussian blur). If this window "slides" neatly in raster order, producing this sample window is relatively straightforward and, to a large degree, does not become markedly more difficult as the sample window increases in size (e.g. larger radius Gaussian blurs).

While this works for brute-force algorithms, algorithms that work on large data sets often need perform more specific and targeted computations (for the sake of computational efficiency). In this case, the sample windows that are computed upon are generally arbitrarily-located windows within a larger search space. A similar situation occurs if the analysis is data-dependent. Producing sample windows for these more advanced algorithms is a much more difficult problem.

One solution stores the data representing the larger search space in a buffer and uses a series of random memory accesses into that buffer to gradually construct the required sample. However, this solution creates a bottleneck at the memory, limiting the speed of computation. This is because real memory has limited I/O capacity (i.e. simultaneous read ports), whereby the speed at which "full" samples can be accessed is inversely related to the size of the sample window; (e.g., algorithms with very large sample windows simply cannot run as quickly as those with smaller windows). Another issue is that unless the sample is very small, the entire sample cannot be accessed at once. This strongly limits the amount of parallel computation that can be performed. Notwithstanding, this is the solution that is implemented on a CPU.

An alternative solution avoids the memory bottleneck by creating multiple identical copies of the larger search space using multiple buffers. In this way, parallel data items are produced within the requested window, only limited by the number of parallel buffers. This solution is amenable to a direct hardware implementation. However, having multiple copies comes at a significant resource cost, as essentially the amount of memories needed is proportional to the window size if normalized to a constant performance requirement.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards distributing multidimensional data among memories such that a patch/window of the multidimensional data is able to filled in parallel data read operations. The number of memories is determined based upon a product of a length of each dimension of the patch that is used in processing the multidimensional data. The memories are read to fill a positioned patch of data with the multidimensional data associated with a position of the patch via a parallel read of each of the memories.

In one or more aspects, a distribution process is configured to determine a number of memories based upon multidimensional patch dimensions. The distribution process loads the memories with data from a multidimensional array in an interleaved manner, in which the interleaving provides that any patch of data (that corresponds to the multidimensional patch dimensions) that is filled by reading the memories has each data access unit (one or more items read or written together as a unit) read from a different memory.

One or more aspects are directed towards loading multidimensional data into a plurality of memories, determining addresses in each of the memories based upon a position of a window, and filling a data window with a single parallel read of the plurality of memories. Data corresponding to the window data is output, and the process repeated for different window positions. The window data may be rotated to provide the data corresponding to the window data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIGS. 2A and 2B are representations of how data may be loaded into memories in an interleaved manner for subsequent parallel reading, according to one or more example implementations.

DETAILED DESCRIPTION

Various aspects of the technology described herein are generally directed towards dividing data to be processed among separate memories (comprising a "patch cache"), each memory holding a different, but interleaved, portion of the data. The interleaving is based upon the data to be processed (such as image data or other real-world sampled data) being physically or time adjacent, e.g., pixels in an image are adjacent other ones.

The division and interleaving (round-robin) are based upon the dimensions of the patch (e.g., window size in two-dimensional data processing). When a patch is needed for processing, the data are arranged such that each access into the "patch cache" needs to get one and only one value from each memory within the cache. This provides fast single-cycle access and a large degree of aggregate parallel bandwidth.

In general, the technology described herein provides a memory architecture that capitalizes on the natural physical spatial locality of the image or other real-world data to maintain high performance without duplication. This allows extremely high performance with little resource overhead.

It should be understood that any of the examples herein are non-limiting. For instance, benefits are readily apparent in hardware/FPGA/ASIC scenarios, however the technology may be used in other scenarios. Further, two-dimensional image data are used in some of the examples to help convey the concepts in a way that is relatively easy to understand, however image data is only one type of data, and other types of data, including in more than two dimensions, may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data processing and/or connected components in general.

Figure 1:
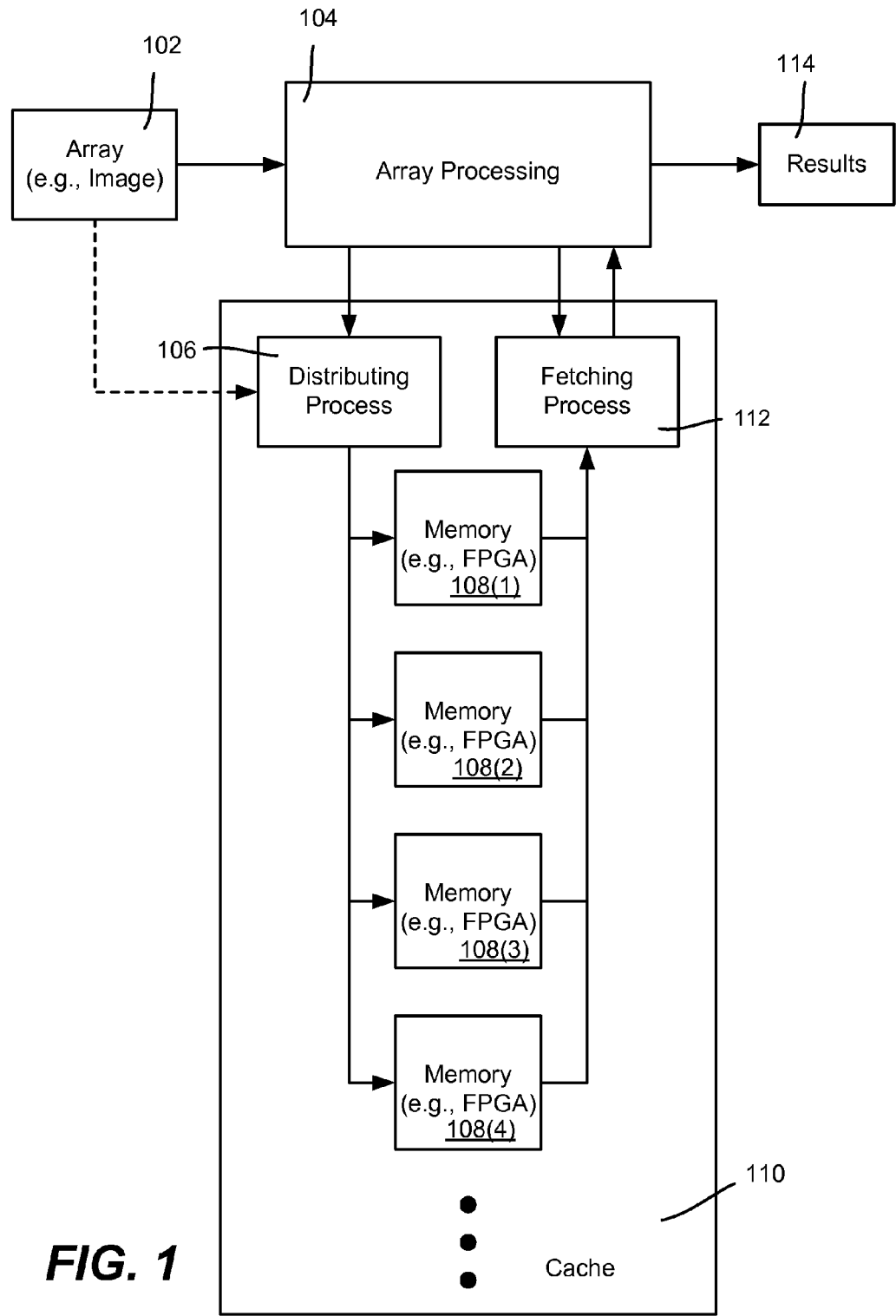
FIG. 1 is a block diagram representing example components that may be used to load multidimensional data for parallel reading, including into and from field programmable gate array (FPGA) memories, according to one or more example implementations.

FIG. 1 shows an example system in which a multidimensional array 102 of data to be processed, (e.g., two-dimensional image data) is processed by an array processing component 104. As described herein, for efficient access, the array processing component 104 is coupled to a data distributing process 106 that writes the array data into a plurality of independent (e.g., FPGA) memories 108(1)-108(4), e.g., collectively arranged as a patch cache 110. The distributing process is shown as being coded into the cache 110, but may be a separate process, and may be incorporated into the array processing component. Note that only four independent memories 108(1)-108(4) are shown in FIG. 1, but that any practical number may be used, and that the number depends on the dimensions of the patch.

To process the data, the array processing component 104 is coupled to a data fetching process 112 that reads a patch of data in parallel from the patch cache 110/independent memories 108(1)-108(4). The array processing component 104 processes each patch, and uses the processing on one or more patches to ultimately provide results 114. Note that the array processing component also may be in hardware, e.g., the patch cache.

To produce arbitrarily located P-sized "patches" from the buffered data, the data is divided among separate memories, each holding a different, but interleaved, portion of the data. The total memory is thus divided among the separate memories; e.g., if a single, serially accessed memory held the data in D space, each of the divided, parallel memories hold D/P of the data.

The dimensions of the data may be enumerated as N, N', N" and so forth, up to the number of data dimensions. Each of the dimensions of the patch may be enumerated as P, P', P" and so forth. Internally, the patch cache 110 is organized as an array of independent memories. The number of independent memories (M) is the product of each of the lengths of dimensions in the patch.

Turning to an example, FIG. 2A shows an arrangement to produce a 2×2 patch into a two-dimensional 4×4 space. That is, the patch has dimensions P and P' (each of length two), while the data has dimensions N and N' (each of length four). The sixteen data items are alphabetically represented in FIG. 2A by letters A through P, and by the array indices (0, 0) to (3, 3).

In FIG. 2A and also shown in FIG. 2B, because the patch is 2×2, M=2×2=4 memories are used, denoted as MemW, MemX, MemY and MemZ. If the overall buffer can hold B values over the entire dimensional space, each memory hold B/M values. In this example of FIGS. 2A and 2B, the buffer size B=16, whereby each memory holds 4 values (FIG. 2B).

Data may be written into the cache in raster order, organized by some dimension from N to N' to N" and so forth. These writes are generally low width (e.g., in FIG. 2A only one value wide), but wider data may be accepted. For example, data may come in as one-dimensional strips. A system may accept small length strips; this may be expanded to full-width N length strips or even higher order multi-dimensional strips.

The cache 110 accepts the data and writes it in a round-robin style by dimension. For example, if data arrives in raster-order, first along dimension N, then by dimension N', and so forth, the data for each dimension is written into each of the dimensions in the patch array in turn. This proceeds in a round-robin manner among the first dimension of the patch array across the entire length of first data dimension, wrapping on the first dimension of the patch array. Subsequent data along progressively higher dimensions of the data are distributed round-robin across progressively higher dimensions of the patch array, again wrapping each dimension of the patch array. If the dimension order of the data is higher than the dimension order of the patch, the round-robin ordering restarts at the first dimension of the patch. This distribution (e.g., for three dimensions) may be represented as:

column=column address mod P
row=row address mod P'
depth=depth address mod P"

For example, in FIG. 2A, the MemW and MemX memories are in the first row of the dimension P×P' array (along the P dimension) and the MemY and MemZ memories are in the second row of the dimension P×P' array (again, along the P dimension but this time in the next P' dimension row).

Because in this example the length of the N dimension of the data is four, and the P dimension of the patch is two, the first two data points A and B enter the cache and are placed into the MemW and MemX memories, respectively. When the third data point C enters the cache, the length of the P dimension has been exhausted, but the N dimension has not. Thus, the P dimension will wrap around and the third and fourth data points C and D are placed in the MemW and MemX memories, respectively.

At this point, the N dimension has been exhausted, so the fifth, sixth, seventh, and eighth data points (E-H) enter the MemY, MemZ, MemY, MemZ memories in a similar fashion.

At this time, both the N dimension and P' dimension have been exhausted, but the N' dimension has not, whereby the ninth, tenth, eleventh and twelfth data points (I-L) wrap around along the P' dimension back to the MemW and MemX memories. This continues to the end of the N×N' data, e.g., M-P are written to the MemY and MemZ memories in the example of FIGS. 2A and 2B.

Note that to maintain a 2×2 patch but with a third data dimension (e.g. the input data were a 2D image over time), and the desire is to get any 2×2 patch of the image from any time slice across the N" dimension (e.g., the dimension of the patch array is smaller than the dimension of the data), the second, third and so forth time slices across the N" dimensions wrap back to the first P dimension in the same MemW, MemX, MemW, MemX, MemY, MemZ, MemY, MemZ, MemW, MemX . . . arrangement.

Figure 3:
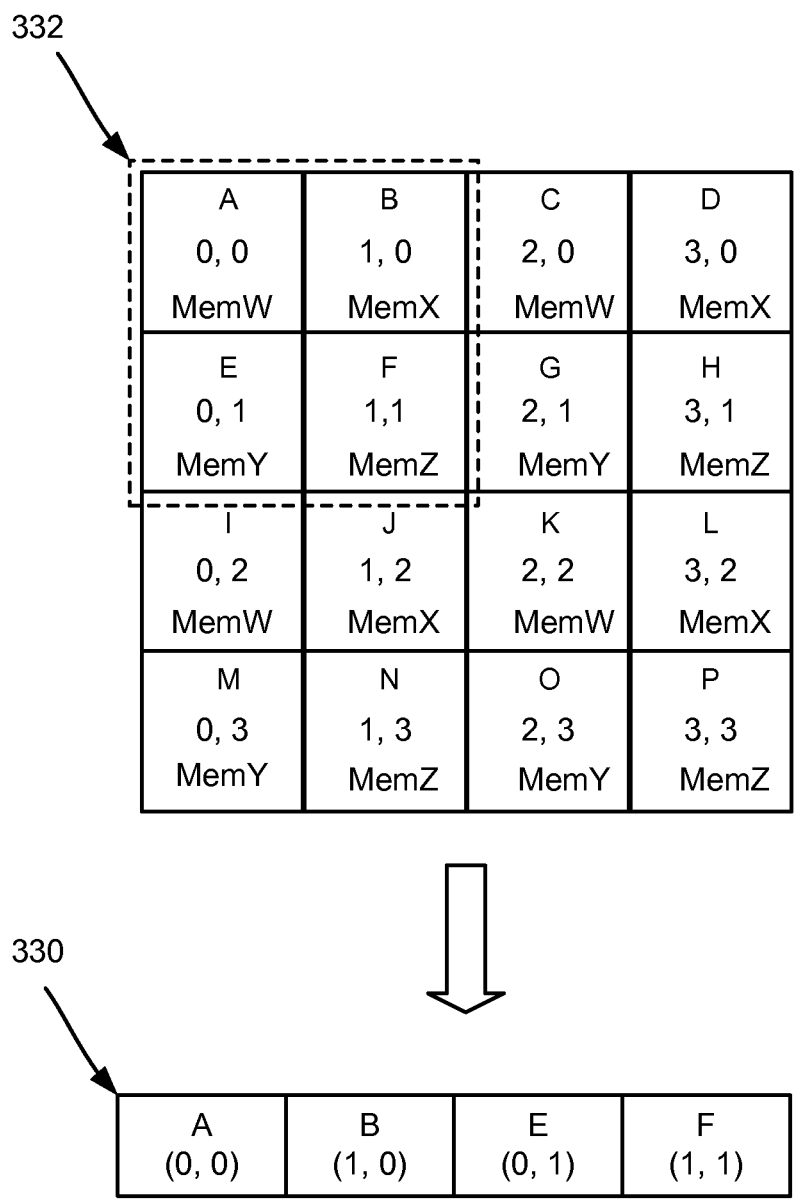
FIG. 3 is a representation of a window of data being filled by parallel memory reads, according to one or more example implementations.
Figure 4:
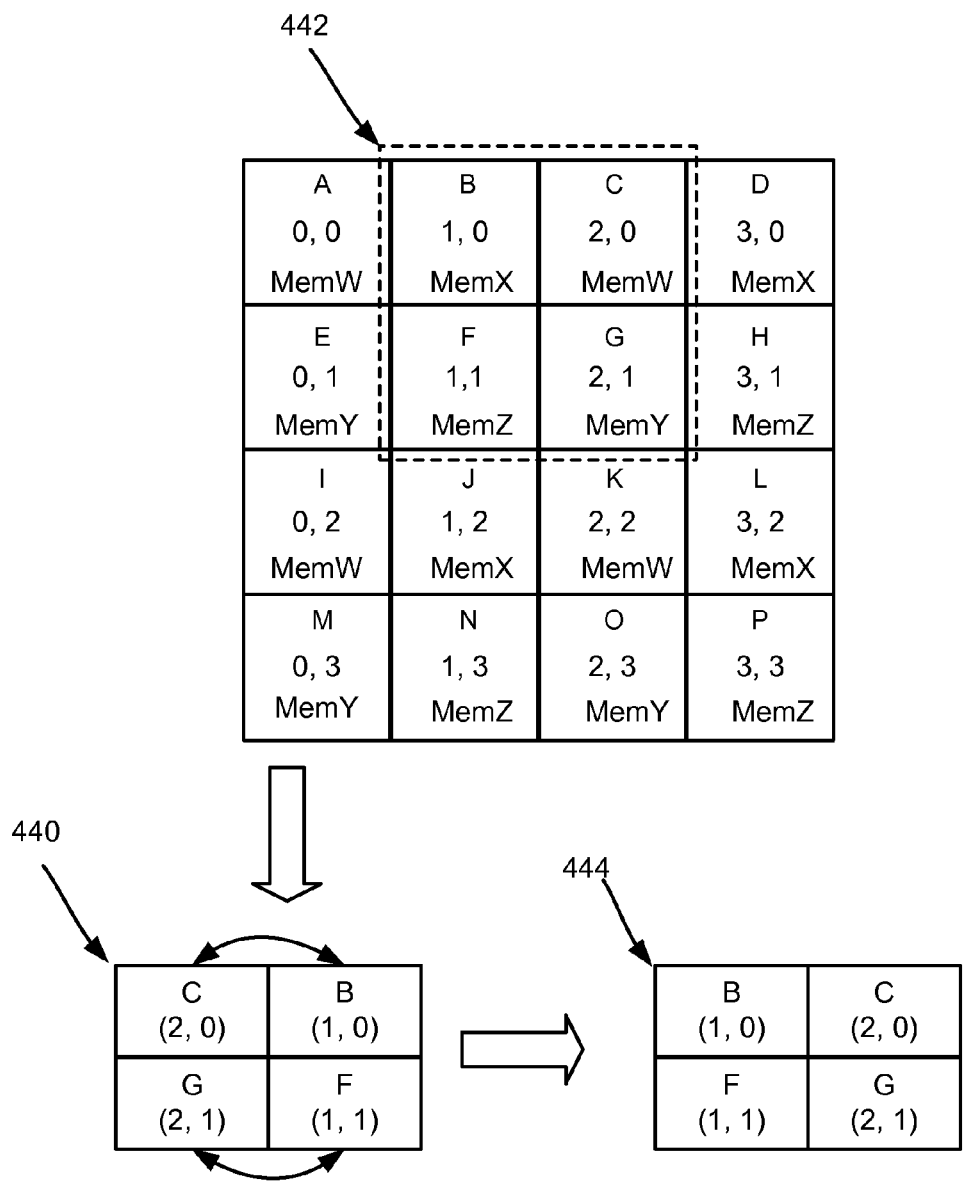
FIG. 4 is a representation of a window of data being filled by parallel memory reads, in which horizontal rotation of the data is performed based upon the window position to provide a consistent return pattern, according to one or more example implementations.
Figure 5:
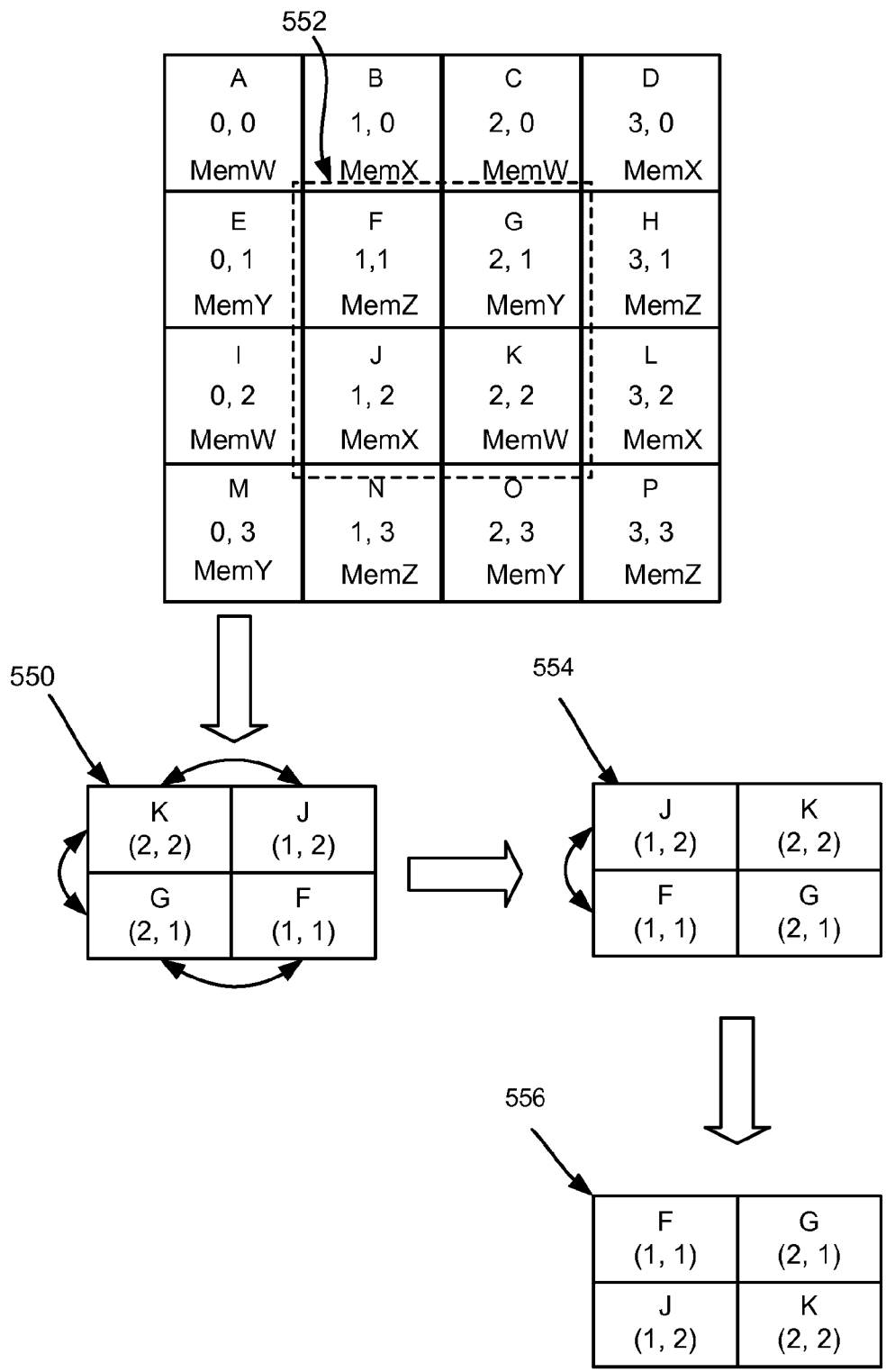
FIG. 5 is a representation of a window of data being filled by parallel memory reads, in which horizontal and vertical rotation of the data is performed based upon the window position to provide a consistent return pattern, according to one or more example implementations.

When the data is distributed and needs to be read back from the memory as a "P×P'×P" . . . " patch, the output from each memory can be re-arranged along each dimension to a consistent orientation. For example, as shown in FIGS. 3-5, the top left pixel in any 2×2 patch (represented by the dashed boxes) may come from any of the four memories in the array. Thus, if the data are returned in order from MemW, MemX, MemY, MemZ, the order does not correspond to the patch order. For example, in FIG. 4, B, C, F, G is desired as the patch data, however the order corresponding to MemW, MemX, MemY and MemZ is C, B, G and F.

For some usage scenarios, the order is irrelevant, e.g., if the array processing component 104 is simply summing the returned values. However, other applications expect the data to be returned in a consistent manner, e.g., top left, top right, and lower left, lower right.

Assuming that the outputs from the memories remain static, these values may need to be rotated along each axis (dimension P and then subsequently by dimension P') to ensure that the top left pixel of each resulting patch remains in a consistent location, and so on.

As can be seen, the data 330 from the patch 332 in FIG. 3 needs no reordering. The data 440 from the patch 442 in FIG. 4 needs a horizontal shift of each row to obtain the ordered data 444, namely B, C, F, G.

The data 550 in patch 552 in FIG. 5 needs both horizontal shifting (data 554) and vertical shifting (data 556) to get F, G, J, and K. Note further that the row data in FIG. 5 needs to be accessed via an offset to account for the next vertical row, e.g., memory MemW is arranged as A (0,0), C, (0, 2), I (2,0) and K (2,2). As used herein, with the patch window's row height being two in this example, MemW is considered as having two sections that correspond to this offset, namely section 0 containing A (0,0) and C, (0, 2), and section 1 containing I (2,0) and K (2,2). This section-based offset addressing allows the patch window to be filled with the correct data when positioned at any row, as in FIG. 5.

Rotation may be efficiently accomplished by a series of shift registers. The rotations (e.g., in two dimensions) for any patch (window) dimensions are determined according to:

$$X_{Rot} = X \% A_{wY}$$

$$Y_{Rot} = Y \% A_{wY}$$

where % indicates modulo and $A_{wX}$ and $A_{wY}$ define the access window, that is, the patch dimensions, and X and Y are the starting coordinates of the patch.

Figure 6:
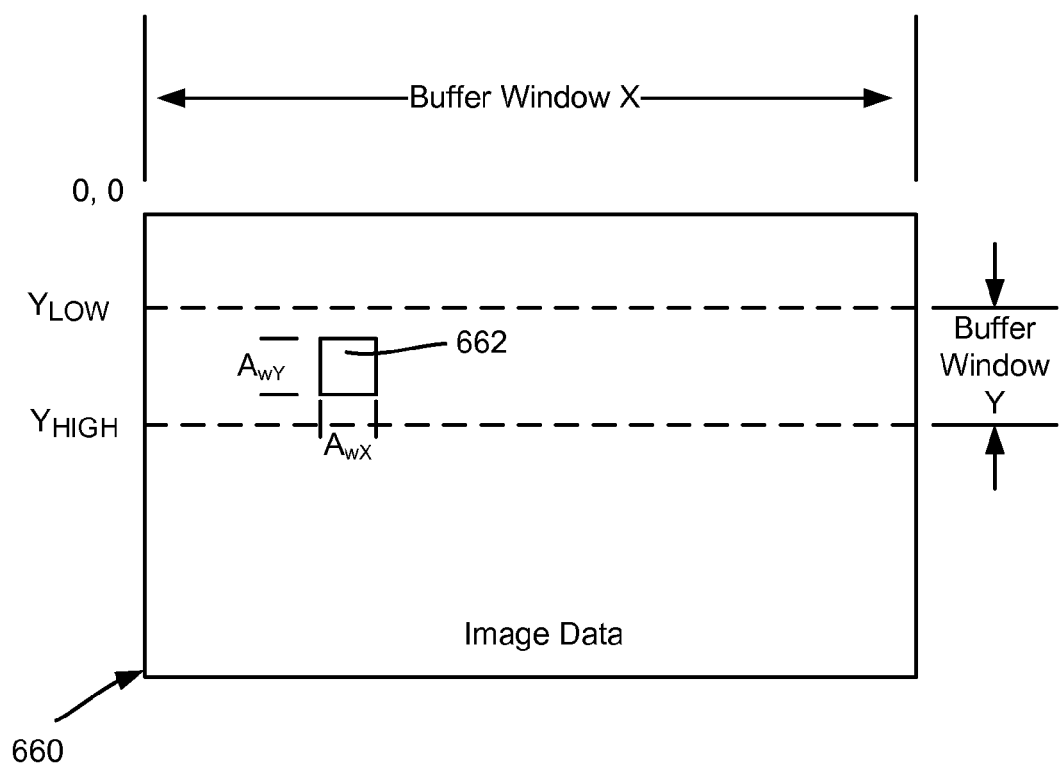
FIG. 6 is a representation of how a subset of multidimensional data may be buffered, according to one or more example implementations.

An entire array (e.g., a full set of image data) need not be put into the cache at the same time. For example, as generally shown in FIG. 6, a part (e.g., a band) of an image 660 may be written to the memories, and read back and processed. In FIG. 6, the band being read is between $Y_{LOW}$ and $Y_{HIGH}$, indicated by the dashed horizontal lines. In general, the patch/access window 662 needs to be able to be positioned (aligned on pixels) anywhere in the band, and is defined by $A_{wX}$ (patch width) and $A_{wY}$ (patch height), which, for example, may be the 2×2 window in the above examples. As can be readily appreciated, in a sliding window scenario that never moves upwardly, once the window moves down a line, that line is freed and may be overwritten with more data to process, as long as the wrapping/circular buffer situation is tracked (as the next lower line in the image is now above the sliding window in the buffer).

In some implementations having dual ported memory, one part of the memories may be written while reading from another part. Thus, as a line is freed, it may be written while the next line is being processed. In a non-dual ported memory scenario, the reading needs to pause when new writes are needed. Also, as described below, with dual ported memory there may be times when both ports are being used for reads; if this is not the case, reads and writes can occur on the same cycle. However, this opportunity may not occur, or the writes may fall behind the reads, whereby some pausing of the reads needs to occur.

Figure 7:
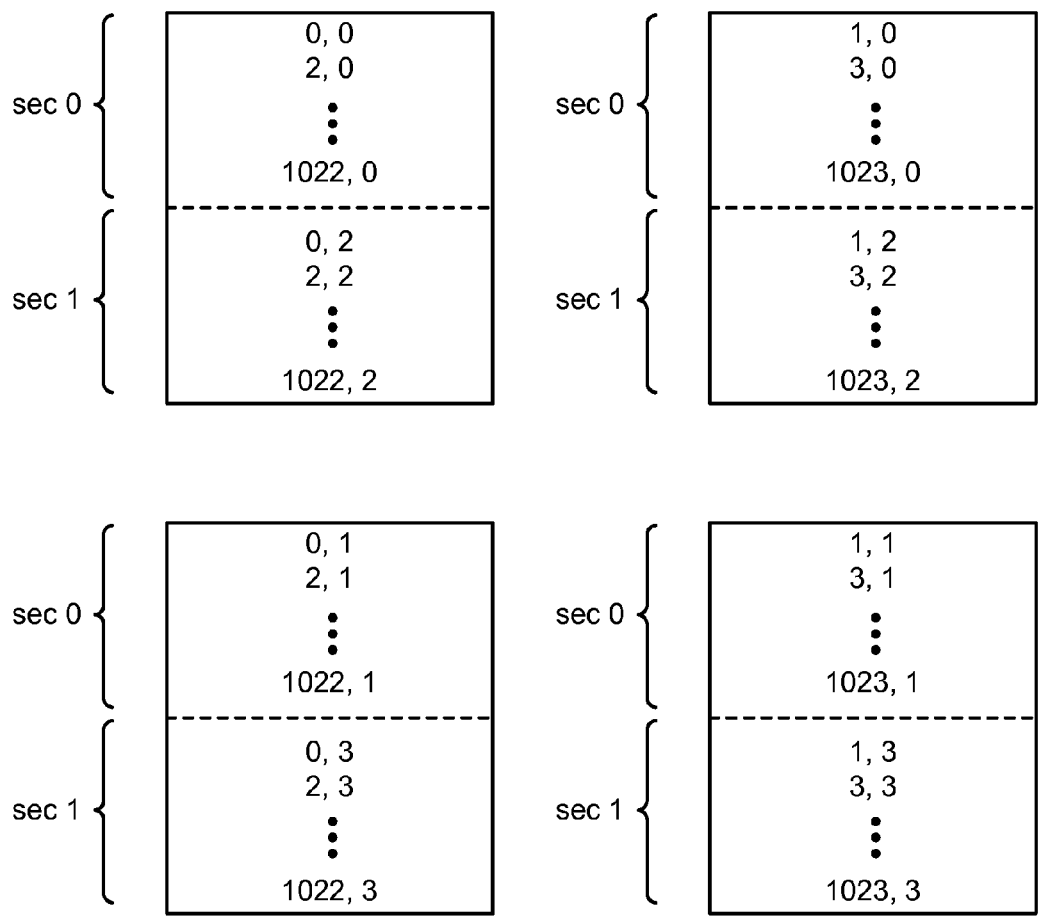
FIG. 7 is a representation of how memories may be arranged with section-based offsets, according to one or more example implementations.

FIG. 7 shows each memory is divided into sections, e.g., sec 0 or sec 1, to provide the offset into the data to match the patch's vertical row position as described above. To this end, the section number is calculated from the Y-coordinate in order to give the starting address for the part of the memory that contains the line being accessed. In other words, the section number, and thus the address in the memory is based upon the Y-coordinate; to find an address in the memory for a section of a certain size (sec size), the following may be used:

$$\text{sec\#} = \frac{Y - Y_{LOW} + A_{wY} - 1}{A_{wY}} \% A_{wY}$$

$$ADDR = (\text{sec\#}) \cdot (\text{sec size}) + \frac{X}{A_{wX}}$$

Figure 8:
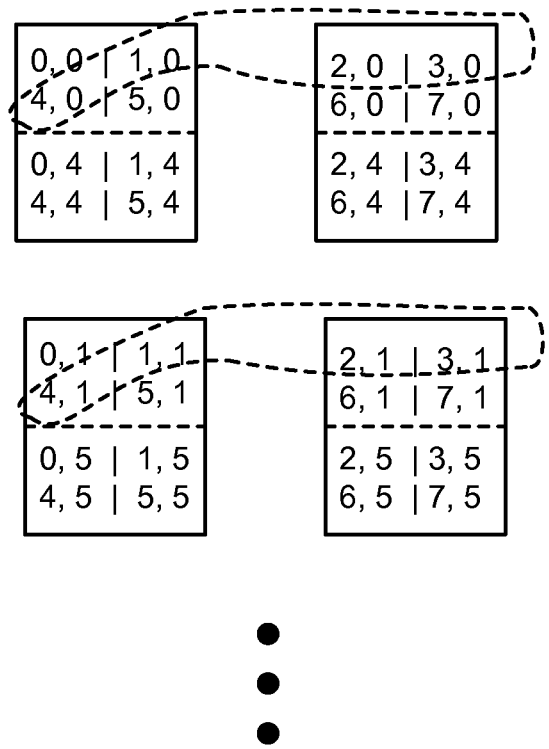
FIG. 8 is a representation of how two lines of a memory may be read, according to one or more example implementations.

FIG. 8 shows another alternative, in which instead of one item of data (e.g., pixel) being returned for a read, two pixels are returned as a unit. This may be because the pixels are eight bits wide and the memory is sixteen bits wide, for example, so two pixels are read at once. Note that as used herein, the term "access unit" refers to whatever reading and writing scheme is in place, e.g., one-byte reads, two-byte reads, four-byte reads and so on. Note that the scheme in use affects the number of memories needed; for example, if the patch is 4×4 and each memory provides two pixels, then two memories across and four memories down are needed.

However, as represented by the dashed lines in FIG. 8, using a 4×4 access window as an example, at times the window is positioned such that more than one line needs to be read from a memory at once to fill the window. This is not a problem with dual ported memory which allows fetching two lines out of one memory; the two lines are concatenated and any rotation handled as described above. However, if not dual ported, two clock cycles are needed. Further, as set forth above, if dual ported but one port is being used for simultaneous writing, then either the write needs to be paused to allow the dual read, or two clock cycles are needed for the read.

Figure 9:
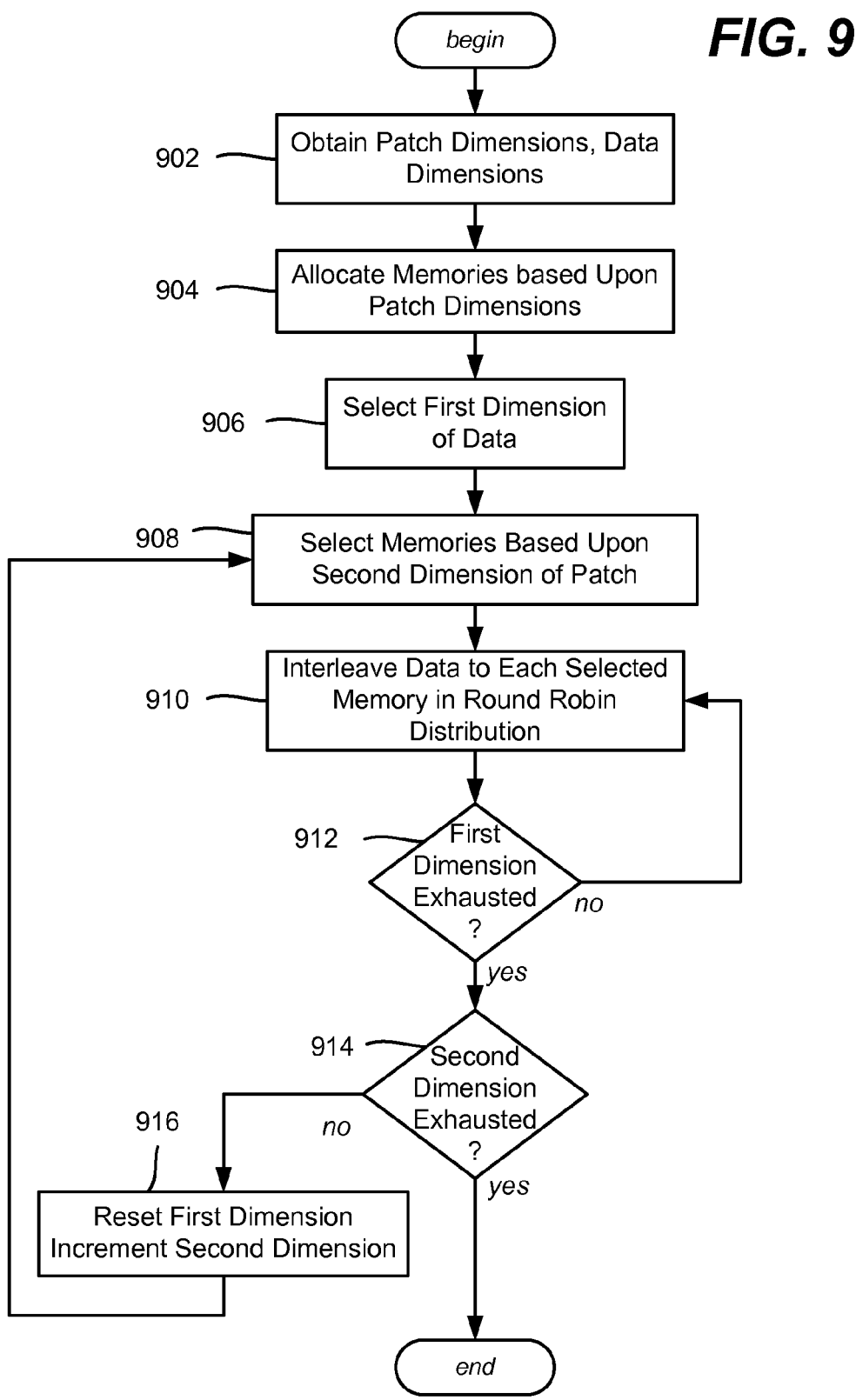
FIG. 9 is a flow diagram representing example steps taken to load memories in an interleaved manner for parallel reading, according to one or more example implementations.

FIG. 9 is a flow diagram showing example steps for interleaving data among memories based upon a window (patch) size. FIG. 9 is generally described with respect to two dimensions, and assumes that the data will fit in the memories (whether as a whole or via a band at a time as described above). Step 902 obtains the patch dimensions, e.g., as part of a setup process performed by the array processing algorithm. Step 904 represents allocating memories according to the patch dimensions, e.g., a 2×2 patch has four memories, a 3×3 nine, a 4×4 sixteen, and so on.

Step 906 selects the first dimension of data, e.g., the X-dimension starting at coordinate zero. Step 908 selects the memories based upon the X-dimension, such as the first two of four memories for a 2×2 patch, the first three for a 3×3 patch, and so on.

Step 910 represents the interleaving of the data along the X-axis among the selected memories, e.g., alternating between them. Note that the data wraps in the selected memories as needed, as described above. This continues until the first dimension is exhausted, that is, the entire line is placed in the selected memories.

When the first dimension is exhausted, step 914 evaluates whether the second dimension is exhausted, e.g., the last row has been placed into the memories. If not, at step 916 the first dimension is "reset" (e.g., the X-coordinate returns to zero) and the next dimension incremented, e.g., the Y-coordinate is moved to the next line.

Step 908 selects the next memories, e.g., not the ones used previously. For example, with a 2×2 patch, every other row is placed into a different pair of the memories; for a 3×3 patch, every third row into a different set of three memories, and so on. In this way, every value in a window is in a different memory.

The process continues alternating among memories along the columns until the first dimension (row) is exhausted, and alternating among memories along the rows until all rows are exhausted. At this time, the memory is ready for reading. Note that as described above, if a sliding window scenario is in use, reading may begin as soon as enough lines to fill a patch with data have been written. If the window is allowed to be positioned anywhere in the buffer at any time, then the buffer needs to be filled.

Figure 10:
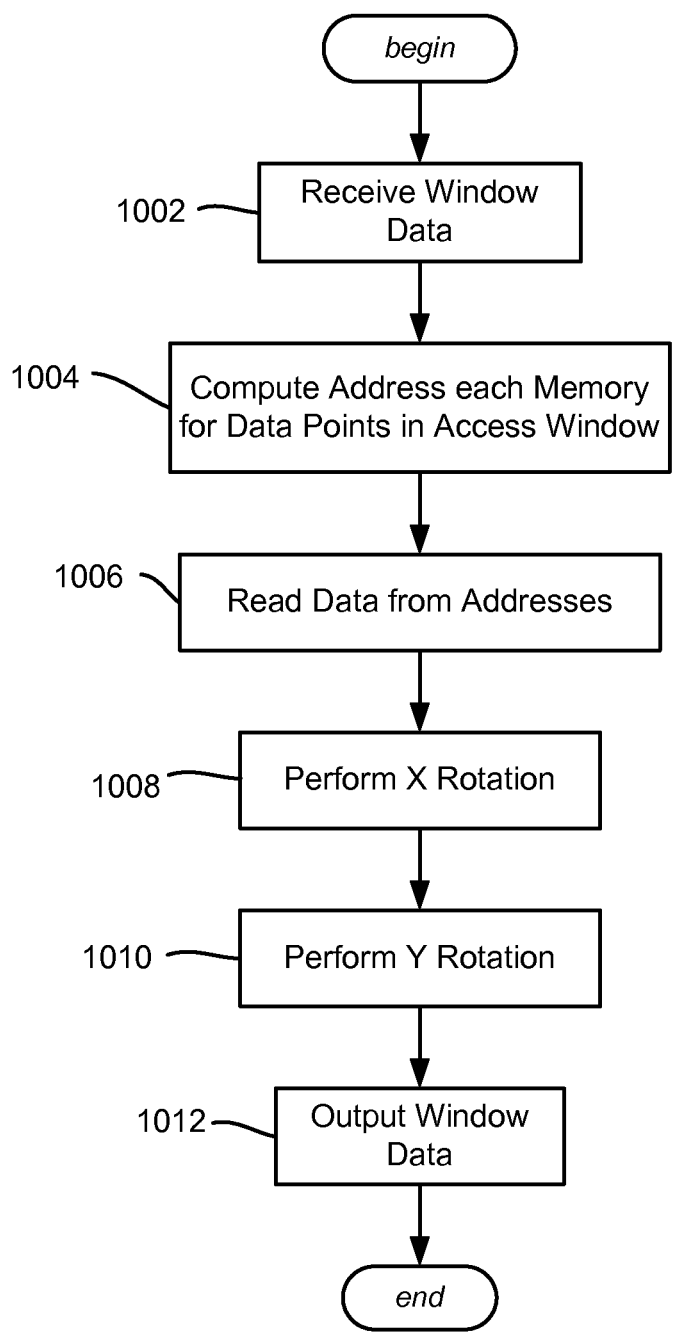
FIG. 10 is a flow diagram representing example steps taken to read patch/window data in parallel and if necessary rotate the data, according to one or more example implementations.

FIG. 10 represents reading the data, beginning at step 1002 where the window data (e.g., the starting coordinate and size) are received. Note that in a sliding window scenario, the logic of FIG. 10 may simply receive a "next position" command and move the window horizontally until it needs to move down to the next line.

Step 1004 represents computing the address in each memory for the data points in the access window, e.g., using the address computations described above. Note that rather than the full computation, in a sliding window scenario the previous computation may be used to determine the next location in each memory because the window position and underlying memory changes regularly.

Step 1006 reads the memories at their respective addresses, in parallel, into a set of shift registers or the like. As described above, step 1008 performs any needed X rotation, and step 1010 any needed Y rotation. At this time, the window is output, filled with the correct data in the correct order.

Example Operating Environment

Figure 11:
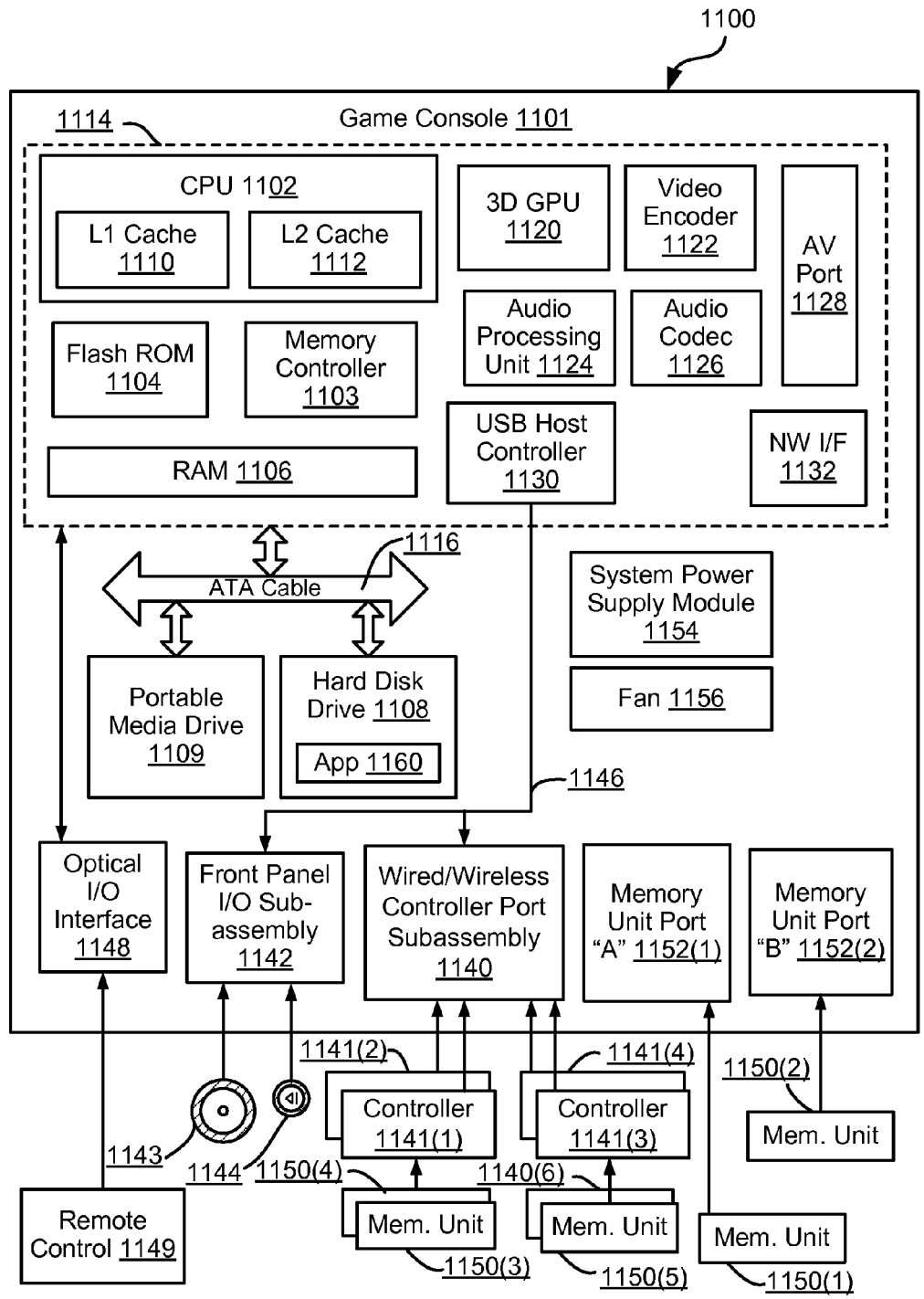
FIG. 11 is a block diagram representing an exemplary non-limiting computing system or operating environment, in the form of a gaming system, into which one or more aspects of various embodiments described herein can be implemented.

FIG. 11 illustrates an example of a suitable computing and networking environment/system 1100 into which computer-related examples and implementations described herein may be implemented, for example. As one example, the computing and networking environment 1100 may program an FPGA with data and/or logic to perform multidimensional array processing as described herein, provide input data (e.g., capture images), receive output data, and so forth. Notwithstanding, the computing and networking environment 1100 also may implement the technology described in FIGS. 1-10 in software, at least in part.

It can be readily appreciated that the above-described implementation and its alternatives may be implemented on any suitable computing device, including a gaming system, personal computer, tablet, DVR, set-top box, smartphone and/or the like. Combinations of such devices are also feasible when multiple such devices are linked together. For purposes of description, a gaming (including media) system is described as one exemplary operating environment hereinafter.

FIG. 11 is a functional block diagram of an example gaming and media system 1100 and shows functional components in more detail. Console 1101 has a central processing unit (CPU) 1102, and a memory controller 1103 that facilitates processor access to various types of memory, including a flash Read Only Memory (ROM) 1104, a Random Access Memory (RAM) 1106, a hard disk drive 1108, and portable media drive 1109. In one implementation, the CPU 1102 includes a level 1 cache 1110, and a level 2 cache 1112 to temporarily store data and hence reduce the number of memory access cycles made to the hard drive, thereby improving processing speed and throughput.

The CPU 1102, the memory controller 1103, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1102, the memory controller 1103, the ROM 1104, and the RAM 1106 are integrated onto a common module 1114. In this implementation, the ROM 1104 is configured as a flash ROM that is connected to the memory controller 1103 via a Peripheral Component Interconnect (PCI) bus or the like and a ROM bus or the like (neither of which are shown). The RAM 1106 may be configured as multiple Double Data Rate Synchronous Dynamic RAM (DDR SDRAM) modules that are independently controlled by the memory controller 1103 via separate buses (not shown). The hard disk drive 1108 and the portable media drive 1109 are shown connected to the memory controller 1103 via the PCI bus and an AT Attachment (ATA) bus 1116. However, in other implementations, dedicated data bus structures of different types can also be applied in the alternative.

A three-dimensional graphics processing unit 1120 and a video encoder 1122 form a video processing pipeline for high speed and high resolution (e.g., High Definition) graphics processing. Data are carried from the graphics processing unit 1120 to the video encoder 1122 via a digital video bus (not shown). An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link (not shown). The video and audio processing pipelines output data to an A/V (audio/video) port 1128 for transmission to a television or other display/speakers. In the illustrated implementation, the video and audio processing components 1120, 1122, 1124, 1126 and 1128 are mounted on the module 1114.

FIG. 11 shows the module 1114 including a USB host controller 1130 and a network interface (NW I/F) 1132, which may include wired and/or wireless components. The USB host controller 1130 is shown in communication with the CPU 1102 and the memory controller 1103 via a bus (e.g., PCI bus) and serves as host for peripheral controllers 1134. The network interface 1132 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 11, the console 1101 includes a controller support subassembly 1140, for supporting four game controllers 1141(1)-1141(4). The controller support subassembly 1140 includes any hardware and software components needed to support wired and/or wireless operation with an external control device, such as for example, a media and game controller. A front panel I/O subassembly 1142 supports the multiple functionalities of a power button 1143, an eject button 1144, as well as any other buttons and any LEDs (light emitting diodes) or other indicators exposed on the outer surface of the console 1101. The subassemblies 1140 and 1142 are in communication with the module 1114 via one or more cable assemblies 1146 or the like. In other implementations, the console 1101 can include additional controller subassemblies. The illustrated implementation also shows an optical I/O interface 1148 that is configured to send and receive signals (e.g., from a remote control 1149) that can be communicated to the module 1114.

Memory units (MUs) 1150(1) and 1150(2) are illustrated as being connectable to MU ports "A" 1152(1) and "B" 1152(2), respectively. Each MU 1150 offers additional storage on which games, game parameters, and other data may be stored. In some implementations, the other data can include one or more of a digital game component, an executable gaming application, an instruction set for expanding a gaming application, and a media file. When inserted into the console 1101, each MU 1150 can be accessed by the memory controller 1103.

A system power supply module 1154 provides power to the components of the gaming system 1100. A fan 1156 cools the circuitry within the console 1101.

An application 1160 comprising machine instructions is typically stored on the hard disk drive 1108. When the console 1101 is powered on, various portions of the application 1160 are loaded into the RAM 1106, and/or the caches 1110 and 1112, for execution on the CPU 1102. In general, the application 1160 can include one or more program modules for performing various display functions, such as controlling dialog screens for presentation on a display (e.g., high definition monitor), controlling transactions based on user inputs and controlling data transmission and reception between the console 1101 and externally connected devices.

The gaming system 1100 may be operated as a standalone system by connecting the system to high definition monitor, a television, a video projector, or other display device. In this standalone mode, the gaming system 1100 enables one or more players to play games, or enjoy digital media, e.g., by watching movies, or listening to music. However, with the integration of broadband connectivity made available through the network interface 1132, gaming system 1100 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   receiving a request to process multidimensional data of an image;
   based on the request, identifying a window to apply to the image, the window comprising a first dimension having a first length and a second dimension having a second length;
   determining a subset of a plurality of memories to distribute the multidimensional data of the image among, the determining comprising multiplying the first length of the first dimension of the window by the second length of the second dimension of the window, wherein a number of memories in the subset of the plurality of memories is equal to a product of multiplying the first length by the second length;
   loading, in an interleaved manner, the multidimensional data into the subset of the plurality of memories;
   upon loading the multidimensional data, executing a parallel read of the subset of the plurality of memories;
   filling a data window with the multidimensional data based on the parallel read of the subset of the plurality of memories; and
   processing the multidimensional data in the data window.

2. The method of claim 1 wherein loading the multidimensional data among the subset of the plurality of memories comprises loading a part of the multidimensional data into a buffer comprising the subset of the plurality of memories.

3. The method of claim 1 wherein loading the multidimensional data comprises writing data corresponding to a first dimension of the multidimensional data to alternate memories in the subset of the plurality of memories corresponding to the first dimension of the window.

4. The method of claim 1 wherein loading the multidimensional data comprises writing data corresponding to a first dimension of the multidimensional data to alternate memories in the subset of the plurality of memories corresponding to the second dimension of the window.

5. The method of claim 1 further comprising accessing a memory of the subset of the plurality of memories based upon a section in the subset of the plurality of memories corresponding to a position of the multidimensional data in the window.

6. The method of claim 1 wherein the subset of the plurality of memories comprise dual ported memories, and wherein reading the subset of the plurality of memories comprises reading data from two addresses in a single cycle.

7. The method of claim 1 wherein the subset of the plurality of memories comprise dual ported memories, and wherein the method further comprises writing to a memory address of a memory of the subset of the plurality of memories while reading from a different or same memory address of the memory.

8. The method of claim 1 further comprising:
to ensure that outputs of the subset of memories are returned in a consistent manner, upon determining that a particular pixel in the data window is not in a predefined location, rotating pixels in the data window one or more times in a horizontal rotation until the particular pixel in the data window is in the predefined location; and
returning the data window to an original orientation after any rotating of the pixels.

9. The method of claim 1 further comprising:
to ensure that outputs of the subset of memories are returned in a consistent manner, upon determining that a particular pixel in the data window is not in a predefined location, rotating pixels in the data window one or more times in a vertical rotation until the particular pixel in the data window is in the predefined location; and
returning the data window to an original orientation after any rotating of the pixels.

10. The method of claim 1 further comprising:
to ensure that outputs of the subset of memories are returned in a consistent manner, upon determining that a particular pixel in the data window is not in a predefined location, rotating pixels in the data window one or more times in a horizontal rotation and at least once in a vertical rotation until the particular pixel in the data window location; and
returning the data window to an original orientation after any rotating of the pixels.

11. A system comprising:
a plurality of memories; and
a processor programmed to:
receive a request to process multidimensional data of an image;
based on the request, identify a window to apply to the image, the window comprising a first dimension having a first length and a second dimension having a second length;
determine a number of the plurality of memories to distribute the multidimensional data among, the determining comprising multiplying a first length of the first dimension of the window by the second length of the second dimension of the window, wherein the number of the memories is equal to a product of multiplying the first length by the second length;
load the number of memories with the multidimensional data of the image data from a multidimensional array in an interleaved manner;
executing a parallel read of the loaded number of memories;
filling a data window with the multidimensional data based on the parallel read of the number of memories; and
processing the multidimensional data in the data window.

12. The system of claim 11 wherein the number of memories are one of the following: contained in a single field programmable gate array, or distributed among a plurality of field programmable gate arrays.

13. The system of claim 11 further comprising a fetching process configured to fill a particular window at a given position relative to the multidimensional array with image data read from the number of memories in parallel.

14. The system of claim 13 further comprising an array processing component configured to receive the particular window filled by the fetching process.

15. The system of claim 13 wherein the fetching process is configured to ensure that outputs of the number of memories are returned in a consistent manner by:
determining that a particular pixel in the particular window is not in a predefined location; and
rotating pixels read from the number of memories along the dimensions of the particular window until the particular pixel is in the predefined location when providing the outputs.

16. The system of claim 15 further comprising an array processing component configured to receive the data after rotation by the fetching process.

17. The system of claim 11 wherein the processor is further programmed to load a part of the multidimensional array data into a buffer comprising the number of memories.

18. The system of claim 11 wherein the multidimensional array data comprises at least one set of image data.

19. One or more computer-readable storage media having executable instructions, which perform operations comprising:
receiving a request to process multidimensional data of an image;
based on the request, identifying a window to apply to the image, the window comprising a first dimension having a first length and a second dimension having a second length;
determining addresses in a plurality of memories to store the multidimensional data based upon a position of the window from which the multidimensional data is obtained, the window comprising image data corresponding to pixels in the image;
loading, in an interleaved manner, the multidimensional data into the plurality of memories;
filling a data window with the multidimensional data corresponding to the data window by executing a single parallel read of the plurality of memories; and
processing the multidimensional data corresponding to the filled data window.

20. The one or more computer-readable storage media of claim 19 having further executable instructions comprising:
determining that a particular pixel in the data window is not in a predefined location; and
rotating the multidimensional data in the data window one or more times in a horizontal rotation and at least once in a vertical rotation until the particular pixel in the data window is in the predefined location when processing the multidimensional data; and
returning the data window to an original orientation after rotating of the data.

* * * * *